United States Patent
Christopher et al.

(10) Patent No.: US 9,239,428 B2
(45) Date of Patent: Jan. 19, 2016

(54) EPOXY DISPENSING SYSTEM AND DISPENSING TIP USED THEREWITH

(75) Inventors: Anthony J. Christopher, Andover, MA (US); George Ciolfi, Hampton, NH (US)

(73) Assignee: KSARIA CORPORATION, Methuen, MA (US)

(*) Notice: Subject to any disclaimer, the term of this patent is extended or adjusted under 35 U.S.C. 154(b) by 0 days.

(21) Appl. No.: 13/402,315

(22) Filed: Feb. 22, 2012

(65) Prior Publication Data

US 2013/0075427 A1  Mar. 28, 2013

Related U.S. Application Data

(60) Provisional application No. 61/540,271, filed on Sep. 28, 2011.

(51) Int. Cl.
*B65D 5/66* (2006.01)
*G02B 6/25* (2006.01)
(Continued)

(52) U.S. Cl.
CPC ................ *G02B 6/25* (2013.01); *B01F 13/003* (2013.01); *B01F 15/0037* (2013.01); *B01F 15/0087* (2013.01); *B01F 15/00318* (2013.01);
(Continued)

(58) Field of Classification Search
CPC ........... B01F 15/00318; B01F 15/0037; B01F 15/0087; B01F 15/0237; B01F 5/0615; B29B 7/7447; G02B 6/3857; G02B 6/46
USPC .......... 222/1, 135, 145.5, 52, 137, 145.6, 23, 222/63, 333, 144.5; 451/54; 156/158, 578, 156/64
See application file for complete search history.

(56) References Cited

U.S. PATENT DOCUMENTS

| 3,204,334 A | 9/1965 | Long et al. |
| 3,283,398 A | 11/1966 | Andren |

(Continued)

FOREIGN PATENT DOCUMENTS

| DE | 2513680 A1 | 10/1975 | |
| DE | 19951504 | * 10/2001 | .............. B01F 15/00 |

(Continued)

OTHER PUBLICATIONS

Clean Blast "CleanBlast Fiber Optic Connector End-Face Cleaning System" brochure, 6pps.

(Continued)

*Primary Examiner* — Frederick C Nicolas
*Assistant Examiner* — Bob Zadeh
(74) *Attorney, Agent, or Firm* — Choate, Hall & Stewart LLP; William R. Haulbrook

(57) ABSTRACT

The present disclosure describes, among other things, a method for attaching a fiber optic terminus of a fiber optic connector to a fiber optic cable. The method may include determining a type of epoxy to be mixed from a first material in a first barrel of the dual-barrel cartridge and a second material in a second barrel of the dual-barrel cartridge. The method may include determining a first rate at which to advance a first plunger against the first barrel based at least in part on the type of epoxy to be mixed. The method may include determining a second rate at which to advance a second plunger against the second barrel based at least in part on the type of epoxy to be mixed. The first rate and the second rate may be associated with a proportion between an amount of the first material and an amount of the second material to mix for the epoxy.

19 Claims, 15 Drawing Sheets

(51) Int. Cl.

| | | |
|---|---|---|
| *G02B 6/46* | (2006.01) | |
| *B29B 7/74* | (2006.01) | |
| *B01F 13/00* | (2006.01) | |
| *B01F 15/00* | (2006.01) | |
| *B01F 15/02* | (2006.01) | |
| *B01F 15/04* | (2006.01) | |
| *B05C 17/005* | (2006.01) | |
| *G02B 6/38* | (2006.01) | |
| *B01F 5/06* | (2006.01) | |

(52) U.S. Cl.
CPC ........... *B01F15/0237* (2013.01); *B01F 15/042* (2013.01); *B05C 17/00553* (2013.01); *B29B 7/7447* (2013.01); *G02B 6/46* (2013.01); *B01F 5/0615* (2013.01); *G02B 6/3857* (2013.01); *Y10T 225/30* (2015.04); *Y10T 225/325* (2015.04)

(56) References Cited

U.S. PATENT DOCUMENTS

| | | | |
|---|---|---|---|
| 3,456,324 A | 7/1969 | Hahn et al. | |
| 3,686,752 A | 8/1972 | Hammond | |
| 3,703,954 A | 11/1972 | Gudmestad | |
| 3,768,143 A | 10/1973 | Holmes, Jr. | |
| 3,875,662 A | 4/1975 | Folk | |
| 3,909,900 A | 10/1975 | Gudmestad | |
| 3,973,600 A | 8/1976 | Choromokos | |
| 4,175,316 A | 11/1979 | Gudmestad | |
| 4,214,848 A | 7/1980 | Verwey et al. | |
| 4,276,113 A | 6/1981 | Carlsen et al. | |
| 4,291,502 A | 9/1981 | Grimsby et al. | |
| 4,336,047 A | 6/1982 | Pavlopoulos et al. | |
| 4,410,561 A | 10/1983 | Hart, Jr. | |
| 4,440,053 A | 4/1984 | Suzuki et al. | |
| 4,489,830 A | 12/1984 | Charlebois et al. | |
| 4,525,312 A | 6/1985 | Jones | |
| 4,531,702 A | 7/1985 | Plummer | |
| 4,597,338 A | 7/1986 | Kreeger | |
| 4,627,942 A | 12/1986 | Gagen et al. | |
| 4,662,307 A | 5/1987 | Amos et al. | |
| 4,671,629 A | 6/1987 | Doyle | |
| 4,749,252 A | 6/1988 | Yanagi et al. | |
| 4,762,580 A | 8/1988 | Robertson | |
| 4,763,272 A | 8/1988 | McLandrich | |
| 4,840,449 A | 6/1989 | Ghandeharizadeh | |
| 4,846,343 A | 7/1989 | Rupert | |
| 4,865,411 A | 9/1989 | Darsey et al. | |
| 4,881,820 A * | 11/1989 | Luckhoff | 366/142 |
| 4,916,811 A | 4/1990 | Uehara et al. | |
| 4,944,079 A | 7/1990 | Nakamura et al. | |
| 4,976,596 A | 12/1990 | Darsey et al. | |
| 4,978,413 A | 12/1990 | Schotter | |
| 5,013,121 A | 5/1991 | Anton et al. | |
| 5,022,735 A | 6/1991 | Dahlgren | |
| 5,066,149 A | 11/1991 | Wheeler et al. | |
| 5,074,635 A | 12/1991 | Justice et al. | |
| 5,093,048 A | 3/1992 | Kagan | |
| 5,117,528 A | 6/1992 | Kanayama et al. | |
| 5,149,350 A | 9/1992 | Itoh et al. | |
| 5,157,751 A | 10/1992 | Maas et al. | |
| 5,159,655 A | 10/1992 | Ziebol et al. | |
| 5,168,617 A | 12/1992 | Tsuchida et al. | |
| 5,179,608 A | 1/1993 | Ziebol et al. | |
| 5,207,642 A * | 5/1993 | Orkin et al. | 604/65 |
| 5,208,977 A | 5/1993 | Ricard | |
| 5,214,732 A | 5/1993 | Beard et al. | |
| 5,238,147 A * | 8/1993 | Yasui et al. | 222/1 |
| 5,239,604 A | 8/1993 | Ziebol et al. | |
| 5,240,489 A | 8/1993 | Robson | |
| 5,261,019 A | 11/1993 | Beard et al. | |
| 5,277,730 A | 1/1994 | Darsey et al. | |
| 5,293,582 A | 3/1994 | Beard et al. | |
| 5,316,243 A | 5/1994 | Henneberger | |
| 5,351,334 A | 9/1994 | Chun et al. | |
| 5,358,583 A | 10/1994 | Hatchadoorian et al. | |
| 5,367,591 A | 11/1994 | Seike et al. | |
| 5,381,497 A | 1/1995 | Toland et al. | |
| 5,386,488 A | 1/1995 | Oikawa | |
| 5,386,490 A | 1/1995 | Pan et al. | |
| 5,395,101 A | 3/1995 | Takimoto et al. | |
| 5,403,227 A | 4/1995 | Franklin et al. | |
| 5,441,175 A * | 8/1995 | Jacobsen et al. | 222/137 |
| 5,442,725 A | 8/1995 | Peng | |
| 5,447,464 A | 9/1995 | Franklin et al. | |
| 5,469,521 A * | 11/1995 | Coutts et al. | 385/77 |
| 5,475,784 A | 12/1995 | Bookbinder et al. | |
| 5,487,125 A | 1/1996 | Kammlott et al. | |
| 5,497,444 A | 3/1996 | Wheeler | |
| 5,515,472 A | 5/1996 | Mullaney et al. | |
| 5,519,804 A | 5/1996 | Burek et al. | |
| 5,526,157 A | 6/1996 | Kawano | |
| 5,526,833 A | 6/1996 | Crespel et al. | |
| 5,533,160 A | 7/1996 | Watanabe et al. | |
| 5,561,728 A | 10/1996 | Kobayashi et al. | |
| 5,587,116 A | 12/1996 | Johnson et al. | |
| 5,590,234 A | 12/1996 | Pulido | |
| 5,607,282 A | 3/1997 | Brannen et al. | |
| 5,611,015 A | 3/1997 | Tokumaru et al. | |
| 5,715,348 A | 2/1998 | Falkenberg et al. | |
| 5,724,469 A | 3/1998 | Orlando | |
| 5,757,996 A | 5/1998 | Vine | |
| 5,770,001 A | 6/1998 | Nagayama et al. | |
| 5,805,740 A * | 9/1998 | Takagi et al. | 382/257 |
| 5,814,015 A * | 9/1998 | Gargano et al. | 604/67 |
| 5,815,619 A | 9/1998 | Bloom | |
| 5,816,445 A * | 10/1998 | Gardos et al. | 222/1 |
| 5,835,660 A | 11/1998 | Jung et al. | |
| 5,858,161 A * | 1/1999 | Nakajima et al. | 156/293 |
| 5,871,559 A | 2/1999 | Bloom | |
| 5,896,486 A | 4/1999 | Burek et al. | |
| 5,913,001 A * | 6/1999 | Nakajima et al. | 385/80 |
| 5,926,594 A | 7/1999 | Song et al. | |
| 5,944,660 A * | 8/1999 | Kimball et al. | 600/310 |
| 5,966,492 A | 10/1999 | Bechamps et al. | |
| 5,970,749 A | 10/1999 | Bloom | |
| 5,987,207 A | 11/1999 | Hoke | |
| 6,003,341 A | 12/1999 | Bloom | |
| 6,004,123 A | 12/1999 | Buckley et al. | |
| 6,085,763 A | 7/2000 | Esmaeili et al. | |
| 6,088,503 A | 7/2000 | Chandler et al. | |
| 6,099,392 A | 8/2000 | Wiegand et al. | |
| 6,122,936 A | 9/2000 | Csipkes et al. | |
| 6,139,196 A | 10/2000 | Feth et al. | |
| 6,153,258 A | 11/2000 | Goldman et al. | |
| 6,190,057 B1 | 2/2001 | Osaka et al. | |
| 6,192,180 B1 | 2/2001 | Kim et al. | |
| 6,195,496 B1 | 2/2001 | Daoud | |
| 6,206,583 B1 | 3/2001 | Hishikawa et al. | |
| 6,209,163 B1 | 4/2001 | Clairadin et al. | |
| 6,215,938 B1 | 4/2001 | Reitmeier et al. | |
| 6,230,403 B1 | 5/2001 | Skoolicas et al. | |
| 6,237,370 B1 | 5/2001 | Bloom | |
| 6,240,236 B1 | 5/2001 | Daoud | |
| 6,249,636 B1 | 6/2001 | Daoud | |
| 6,259,855 B1 | 7/2001 | Lundin | |
| 6,264,374 B1 | 7/2001 | Selfridge et al. | |
| 6,272,276 B1 | 8/2001 | Potteiger et al. | |
| 6,388,891 B1 | 5/2002 | Falkenberg et al. | |
| 6,530,246 B1 | 3/2003 | Hausmann | |
| 6,560,666 B1 | 5/2003 | Harriman et al. | |
| 6,560,811 B1 | 5/2003 | Krause et al. | |
| 6,562,164 B1 * | 5/2003 | Faulkner et al. | 156/64 |
| 6,580,866 B2 | 6/2003 | Daoud et al. | |
| 6,608,958 B2 | 8/2003 | Anderson | |
| 6,625,374 B2 | 9/2003 | Holman et al. | |
| 6,662,969 B2 * | 12/2003 | Peeler et al. | 222/1 |
| 6,669,128 B2 | 12/2003 | Appleby et al. | |
| 6,676,763 B2 | 1/2004 | Johnson, III et al. | |
| 6,695,191 B1 | 2/2004 | Tabeling | |
| 6,758,605 B1 | 7/2004 | Villemaire et al. | |
| 6,810,192 B2 | 10/2004 | Aude et al. | |
| 6,895,654 B2 | 5/2005 | Strandberg et al. | |

(56) References Cited

U.S. PATENT DOCUMENTS

| | | | |
|---|---|---|---|
| 6,964,288 B2 | 11/2005 | Christopher et al. | |
| 6,988,854 B2 | 1/2006 | Porter | |
| 7,163,343 B2 | 1/2007 | Matta et al. | |
| 7,266,273 B2 | 9/2007 | Bonicel et al. | |
| 7,457,499 B2 | 11/2008 | Russert et al. | |
| 7,537,139 B2 * | 5/2009 | Jackson et al. | 222/135 |
| 7,809,230 B2 | 10/2010 | Christopher et al. | |
| 7,837,801 B2 | 11/2010 | Christopher et al. | |
| 7,978,950 B2 | 7/2011 | Christopher et al. | |
| 8,394,105 B2 * | 3/2013 | Vendrely et al. | 606/92 |
| 2002/0108636 A1 | 8/2002 | Childers et al. | |
| 2003/0007774 A1 | 1/2003 | Christopher et al. | |
| 2003/0062122 A1 | 4/2003 | Keane et al. | |
| 2003/0169992 A1 | 9/2003 | Fujiwara et al. | |
| 2004/0007250 A1 | 1/2004 | Forrest | |
| 2004/0086232 A1 | 5/2004 | Fujiwara et al. | |
| 2005/0030353 A1 * | 2/2005 | Ord et al. | 347/84 |
| 2005/0044818 A1 * | 3/2005 | Hayduk | 53/459 |
| 2005/0058422 A1 | 3/2005 | Doss et al. | |
| 2005/0127090 A1 * | 6/2005 | Sayers et al. | 222/1 |
| 2005/0230052 A1 | 10/2005 | Christopher et al. | |
| 2006/0191091 A1 | 8/2006 | Kida | |
| 2007/0023067 A1 | 2/2007 | Kida et al. | |
| 2007/0203623 A1 | 8/2007 | Saunders et al. | |
| 2010/0000960 A1 * | 1/2010 | Anderson | 215/228 |
| 2010/0270332 A1 * | 10/2010 | Trout | 222/145.1 |
| 2010/0282772 A1 * | 11/2010 | Ionidis | 222/1 |
| 2011/0044600 A1 | 2/2011 | Christopher et al. | |
| 2011/0108573 A1 * | 5/2011 | Stoeckli et al. | 222/87 |
| 2011/0139821 A1 * | 6/2011 | Greter et al. | 222/145.5 |
| 2012/0051701 A1 | 3/2012 | Sicari et al. | |
| 2012/0097702 A1 * | 4/2012 | Harre et al. | 222/1 |
| 2012/0141082 A1 | 6/2012 | Sawicki et al. | |
| 2013/0075427 A1 | 3/2013 | Christopher et al. | |
| 2013/0078587 A1 | 3/2013 | Christopher et al. | |

FOREIGN PATENT DOCUMENTS

| | | |
|---|---|---|
| EP | 159758 | 10/1985 |
| EP | 0159768 A2 | 10/1985 |
| EP | 0215668 | 3/1987 |
| EP | 0215668 A2 | 3/1987 |
| EP | 999450 A2 | 5/2000 |
| EP | 999460 A2 | 5/2000 |
| JP | 07155706 A | 6/1995 |
| JP | 7155706 A | 6/1995 |
| JP | 9197182 | 7/1997 |
| JP | 09197182 | 7/1997 |
| JP | 2000123661 A | 4/2000 |
| JP | 2001137795 A | 5/2001 |
| JP | 2001149874 A | 6/2001 |
| WO | WO-9711917 | 4/1997 |
| WO | WO-9711917 A1 | 4/1997 |

OTHER PUBLICATIONS

Department of Defense, Standard Practice, USA, "Fiber Optic Cable Topology Installation Standard Methods for Naval Ships (Connectors and Interconnections)" Part 5 of 7 Parts. Military Standard 2042-5B (SH) Jul. 25, 2002 Superseding MII-STD-2042-5A (SH) Sep. 29, 1997 MII-STD-2042-5 (SH) Jul. 7, 1993.

Ericsson Product Literature (1998).

Jacobs, J. "Suggested Guidelines for the Handling of Optical Fiber White Paper" Corning Incorporated (2001).

LuxCis Fiber Optic Assembly Instructions, Randall, Dec. 20, 2004.

Power Point Presentation entitled "Next Generation Manufacturing of MII/Aero Fiber Optic Interconnect Cables" presented at the Defense Manufacturing Conference Nov. (2004).

Seikoh Giken USA "Interconnect Maintenance Solutions" Data Sheet, 1 pg.

U.S. Appl. No. 09/969,544, filed Oct. 2, 2001, Abandonded.

U.S. Appl. No. 09/969,555, filed Oct. 2, 2001, Abandonded.

U.S. Appl. No. 09/969,894, filed Oct. 2, 2001, Abandonded.

* cited by examiner

EPOXY DISPENSING SYSTEM AND DISPENSING TIP USED THEREWITH

RELATED APPLICATIONS

This application claims priority to U.S. Application No. 61/540,271, filed Sep. 28, 2011 and entitled, "Epoxy Dispensing Tool, Modular Epoxy Curing Tool, and Cleave Epoxy Removal Tool," the contents of which are hereby incorporated by reference in their entirety.

BACKGROUND

Materials to be mixed into an epoxy may be provided in separate, connected pouches. A user may merge the contents of the pouches and manually mix the materials to form the epoxy.

SUMMARY

Providing processes and advanced tools to simply and easily perform the termination process for shipboard use is highly beneficial in improving quality, reducing operator training requirements, and reducing one of the major cost elements associated with installing fiber optics shipboard.

Fiber optics is widely used throughout many military platforms, especially shipboard. Fiber optic technology provides many advantages over copper based technology by exhibiting reduced weight, significantly higher bandwidth, and immunity to EMI. Many new, advanced communication systems and sensing systems rely heavily on fiber optics as their underlying infrastructure.

Specifically aboard ships, the fiber optic infrastructure is installed in cableways using hangers as a means of protecting and routing. During shipbuilding, fiber optic cable is installed with two common methods (a) manually pulled through the cableways pre MIL-STD-2042-1 B. This technique is similar to installing electrical cable on Navy ships per DOD-STD-2003; or (b) blown through micro-duct with compressed air, commonly known as Blown 48 Optical Fiber (BOF).

With both methods, the fiber cable is installed in the cableway without terminations/connectors. Fiber optic terminations (example shown in FIG. 14A-14C) are highly polished to provide optimal optical transmission and, as such, are extremely prone to damage by the physical handling of the fiber cable ends during the pull-through process. In the case of blown optical fiber, the termination cause further limitations by inhibiting the ability to carry the fiber cable through the duct with air pressure due to weight and size restrictions. These installation limitations require the optical fiber to be terminated, after routing, in-situ by hand, and prevent pre-terminating the fiber in a controlled manufacturing environment with precise process control. MIL-STD-2042-5B outlines this manual procedure in detail and is used as reference through the shipbuilding industry.

The optical fiber termination process is very complex with as many as 35 discrete steps. FIG. 15 shows the high-level base process steps involved with terminations for reference, each with many sub-process steps not shown. Many of the steps need to be performed to exacting tolerances in order to provide the desired performance levels and reliability.

Further exacerbating the ability to achieve high quality terminations is the working environment aboard ships. The termination process typically occurs in confined areas and in heavily trafficked passageways making detailed precision assembly tasks more difficult to perform and highly prone to error.

The current epoxy dispense method used today typically begins with mixing the two-part epoxy. The epoxy is supplied in a bi-pack with the two parts separated. The technique is responsible for mixing the epoxy by repeatedly squeezing the epoxy from side to side within the package.

Once the epoxy is mixed the technician cuts a corner of the package and dispenses it into a capped syringe. With all of the epoxy dispensed into the syringe, a plunger is then inserted into the syringe barrel and then oriented to allow the epoxy to flow away from the tip. The cap is then removed and a needle is installed on the syringe tip. Air is then purged from the syringe by pointing the needle upwards and depressing the plunger until a continuous stream of epoxy is dispensed from the needle. It should be noted that small air bubbles may still exist in the epoxy from the mixing process that cannot be expelled. Typically in a factory setting, the syringe is spun in centrifuge to remove such small bubbles so that no voids present themselves during the dispense process. A centrifuge is impractical for use in the field, and thus small air bubbles are tolerated in the process although it has been determined that epoxy voids within a terminus can inhibit performance and lead to long term reliability concerns.

After the syringe is prepared, epoxy can now be loaded into a terminus. The practice is to insert the needle into the rear of the terminus until it bottoms out on the ferrule. At that point, the plunger is depressed to dispense epoxy through the hole of the ferrule until it is observed exiting the ferrule tip. Then the needle is pulled back from the ferrule while simultaneously continuing to dispense epoxy. This technique is intended to minimize wetting the needle and removing epoxy from the terminus body. Excessive wetting of the needle is indicative of voids with the body because the epoxy has been taken out with the needle. At the same time, if the needle is extracted too quickly, epoxy can be deposited in a non-uniform manner that captures air pockets or under fills the terminus.

Once the terminus is loaded with epoxy, it is carefully installed over the prepared fiber end. There is also an application of a small amount of epoxy on the Kevlar strands after installation to bolster its pull strength.

This dispense technique to load the terminus with epoxy requires a fair amount of skill to accomplish correctly to minimize epoxy voids with the terminus. A void within the terminus can affect long-term reliability. The typical failure mode associated with a void is that the air pocket can expand excessively with temperature. This expansion causes undue stress on the fiber within the terminus and can cause it to bend. Even slight movement within the terminus can cause micro bending that can result in a high optical loss. Repeated bending cycles may even result in a catastrophic failure whereby the fiber fatigue fractures within the terminus.

This anomaly is most harmful when the void is situated such that the fiber is not encapsulated within the epoxy. A void present prior to curing can expand excessively until the epoxy begins to set. This expansion makes exposure of the fiber within the terminus more likely. Once the void is set within the epoxy and the terminus is placed into use, the asymmetrical internal geometry caused by the void and the CTE mismatch of the encapsulated air, epoxy, glass, metal terminus body, and ceramic ferrule, can push the fiber around within the terminus with temperature fluctuations. This slight movement is what causes the fiber micro-bending and fatigue breaks discussed above.

In some aspects, the present disclosure is directed to a method. The method may include determining a type of epoxy to be mixed from a first material in a first barrel of the dual-barrel cartridge and a second material in a second barrel of the dual-barrel cartridge. The method may include determining a first rate at which to advance a first plunger against the first barrel based at least in part on the type of epoxy to be mixed. The method may include determining a second rate at which to advance a second plunger against the second barrel based at least in part on the type of epoxy to be mixed. The first rate and the second rate may be associated with a proportion between an amount of the first material and an amount of the second material to mix for the epoxy.

In some aspects, determining the type of epoxy to be mixed may include detecting a setting on a control, the setting corresponding to the type of epoxy to be mixed. In some aspects, determining the type of epoxy to be mixed may include detecting a code on the dual-barrel cartridge, the code corresponding to the type of epoxy to be mixed.

In some aspects, detecting the code on the dual-barrel cartridge may include determining whether at least one touch sensor has been triggered. In some aspects, detecting the code on the dual-barrel cartridge may include determining whether at least one light detector has been blocked from receiving light from a light emitter. In some aspects, detecting the code on the dual-barrel cartridge may include detecting at least one position of at least one mechanical switch. In some aspects, detecting the code on the dual-barrel cartridge may include detecting at least one bar code. In some aspects, detecting the code on the dual-barrel cartridge may include detecting at least one alphanumeric code.

In some aspects, determining the first rate at which to advance the first plunger may include accessing an entry in a look-up table associated with the type of epoxy to be mixed, the entry including the first rate. In some aspects, determining the first rate at which to advance the first plunger may include retrieving an entry in a look-up table indexed according to the type of epoxy to be mixed, the entry including the first rate.

In some aspects, the method may include advancing a first plunger pusher to contact a first plunger coupled to the first barrel, and advancing a second plunger pusher to contact a second plunger coupled to the second barrel. In some aspects, advancing the first plunger pusher to contact the first plunger may include advancing the first plunger pusher until a sensor on the first plunger pusher detects the first plunger. In some aspects, advancing the first plunger pusher to contact the first plunger may include advancing the first plunger pusher until a sensor on the first plunger pusher detects a pressure that exceeds a threshold.

In some aspects, the present disclosure is directed to an apparatus. The apparatus may include a first plunger pusher adapted to be coupled to a first plunger connected to a first barrel of the dual-barrel cartridge. The apparatus may include a second plunger pusher adapted to be coupled to a second plunger connected to a second barrel of the dual-barrel cartridge. The apparatus may include a processor. The apparatus may include a memory. The memory may contain instructions when, executed by the processor, cause the processor to determine a type of epoxy to be mixed from a first material in a first barrel of the dual-barrel cartridge and a second material in a second barrel of the dual-barrel cartridge; determine a first rate at which to advance a first plunger against the first barrel based at least in part on the type of epoxy to be mixed, and determine a second rate at which to advance a second plunger against the second barrel based at least in part on the type of epoxy to be mixed.

In some aspects, the apparatus may include a code detector adapted to receive a code on a dual-barreled cartridge loaded onto the apparatus, the code corresponding to the type of epoxy to be mixed.

In some aspects, the present disclosure is directed to an apparatus. The apparatus may include a dispensing tip. The dispensing tip may include a proximal end adapted to be coupled to a mixing nozzle, and a distal end adapted to be inserted into an end of a terminus. A volume of the distal end of the dispensing tip may be selected to match a volume of epoxy displaced by an optical fiber inserted through the terminus and through a ferrule coupled to the terminus.

In some aspects, a length of the distal end and a cross-sectional area of the distal end may be selected to attain the volume. In some aspects, an outer diameter of the distal end may match an inner diameter of a chamber in the end of the terminus. In some aspects, a cross-sectional area of the distal end may match a cross-sectional area of a chamber in the end of the terminus. In some aspects, the dispensing tip may be adapted such that solely the distal end may be inserted into the end of the terminus.

In some aspects, the present disclosure is directed to an apparatus. The apparatus may include a first barrel adapted to contain a first material for forming an epoxy. The apparatus may include a second barrel adapted to contain a second material for forming the epoxy. The apparatus may include a cap receiver including a proximal end adapted to receive at least a portion of the first material from the first barrel and at least a portion of the second material from the second barrel, and a distal end adapted to be coupled to a mixing tip. The apparatus may include a first plunger adapted to advance through the first barrel to expel a portion of the first material into the cap receiver. The apparatus may include a second plunger adapted to advance through the second barrel, independently of the first plunger, to expel a portion of the second material into the cap receiver.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1:
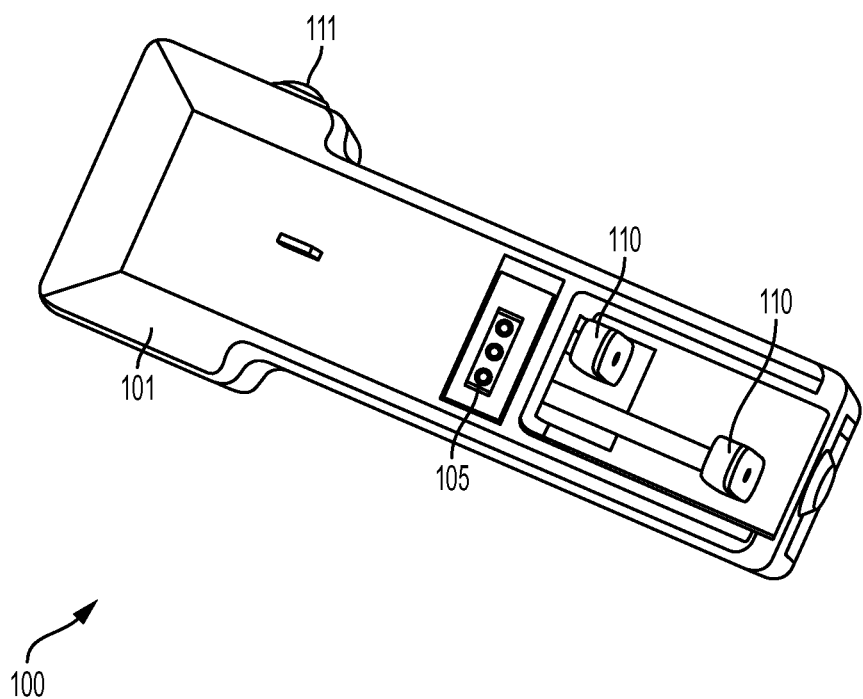
FIG. 1 is a diagram of an exemplary epoxy dispensing system adapted to detect a code on a cartridge indicating a type of epoxy to be mixed from materials in the cartridge.

The features and advantages of the disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In general overview, the present disclosure describes, among other things, an epoxy dispensing system. The epoxy dispensing system may be used with dual-barreled cartridges containing materials to be mixed to form epoxies. Cartridges may contain different materials for forming different types of epoxies. A cartridge may be loaded onto an epoxy dispensing system. The epoxy dispensing system may advance plunger pushers against barrels of the cartridge to dispense the materials therein. As the materials flow through a mixing tip coupled to the cartridge, the materials may fix to form an epoxy.

Each cartridge may include a code indicating the type of epoxy that may be formed from materials in the cartridge's barrels. When a cartridge is loaded onto an epoxy dispensing system, the epoxy dispensing system may detect the code on the cartridge. The code may be associated with and/or indicate the proportion between the materials to be dispensed for mixing the epoxy. Based at least in part on the code, the epoxy dispensing system may determine the rates at which each barrel of the cartridge should be independently advanced to dispense the materials therein in the proportion for the epoxy. Thus, the epoxy dispensing system may accommodate cartridges containing different materials, the materials in each cartridge being mixed in a proportion specific to the type of epoxy to be formed. The dispensed materials may mix as the materials flow through a mixing tip and out through a dispensing tip.

The present disclosure describes, among other things, a dispensing tip tailored to a terminus. The dispensing tip may have a distal end adapted to be coupled to an end of the terminus. The distal end may be inserted into the end of the terminus to substantially form a seal. Epoxy may flow through the dispensing tip to fill at least one internal chamber of the terminus and/or at least one internal chamber of a ferrule. The volume and/or length of the distal end of the dispensing tip may be selected such that when the distal end is removed from the terminus and an optical fiber is inserted through the terminus, the volume of epoxy displaced by the optical fiber substantially matches the volume of the distal end. As the optical fiber is inserted, the displaced epoxy flows to fill the part of the chamber previously occupied by the dispensing tip. Thus, the internal chamber(s) of the terminus may be filled (e.g., completely) with epoxy after the optical fiber is inserted to complete a termination with the terminus.

Referring now to FIG. 1, an exemplary epoxy dispensing system 100 adapted to detect a code on a cartridge indicating a type of epoxy to be mixed from materials in the cartridge is shown and described. The epoxy dispensing system 100 may include a housing 101, a code detector 105, and plunger pushers 110. The housing 101 may be made of any material, such as plastic or metal. In some implementations, the housing 101 may be created from a mold, such as an injection mold.

The code detector 105 may detect a code on a cartridge loaded onto the housing 101. In some implementations, the code detector 105 may include one or more sensors. The code detector 105 may be used with a cartridge that may include components adapted to trigger the one or more sensors. In some implementations, the code detector 105 may include touch sensors. In some implementations, a cartridge may include mechanical components that make contact or do not make contact with the touch sensors, according to a code. For example, mechanical components may make contact with the first and third touch sensors of the code detector 105, but not the second touch sensor. Mechanical components may make contact with all the touch sensors of the code detector 105. Mechanical components may make contact with none of the touch sensors. Mechanical components may make contact with the third touch sensor, but not the first or second touch sensors. Mechanical components may make contact with any or none of the touch sensors. The code detector 105 may determine a code of the cartridge based on the triggered and/or non-triggered sensors.

In some implementations, the code detector 105 may include light emitters that project light onto light detectors. The code detector 105 may be used with a cartridge that may include components adapted to block light projected onto one or more light detectors. For example, when the cartridge is loaded onto the epoxy dispensing system 100, physical components on the cartridge may block light projected from the first and third light emitters onto the first and third light detectors. The cartridge may permit the second light emitter to continue projecting light on the second light detector. The code detector 105 may determine a code of the cartridge based on light detectors that receive or do not receive light from the emitters.

In some implementations, the code detector 105 may include one or more mechanical switches. The code detector 105 may be used with a cartridge that includes components adapted to position the mechanical switches in a configuration corresponding to a code. For example, if a code detector 105 includes three mechanical switches, components on a cartridge may configure the first two switches to be "on" and the third switch to be "off." Components may configure all three switches to be "on." The code detector 105 may determine a code of the cartridge based on the positions of the mechanical switches.

In some implementations, the code detector 105 may include a scanner. The code detector 105 may be used with a cartridge with a label that includes an alphanumeric code or a bar code, by way of example. The code detector 105 may detect the alphanumeric code or bar code, e.g., optically. The code detector 105 may determine a code of the cartridge based on the alphanumeric code or bar code on the cartridge's label.

In some implementations, the code detector 105 may include a radio frequency receiver and/or a radio frequency transceiver. The code detector may be used with a cartridge that includes a radio frequency identification (RFID) chip with an alphanumberic code. In some implementations, the RFID chip may broadcast the alphanumeric code continuously. For example, the RFID chip may transmit a signal with the alphanumeric code whenever a predetermined period of time elapses (e.g., every 5 seconds, every 15 seconds). In some implementations, the RFID chip may transmit a signal with the alphanumeric code in response to a signal from a radio frequency transceiver requesting the code. The radio frequency receiver/transceiver may determine the alphanumeric code from the signal transmitted by the RFID chip.

The epoxy dispensing system 100 may include plunger pushers 110. When a cartridge is loaded onto the epoxy dispensing system 100 and a user activates a dispense button 111, the epoxy dispensing system 100 may the operate the plunger pushers 110 to contact and/or advance the plungers of the cartridge, as described in more detail below.

Figure 2:
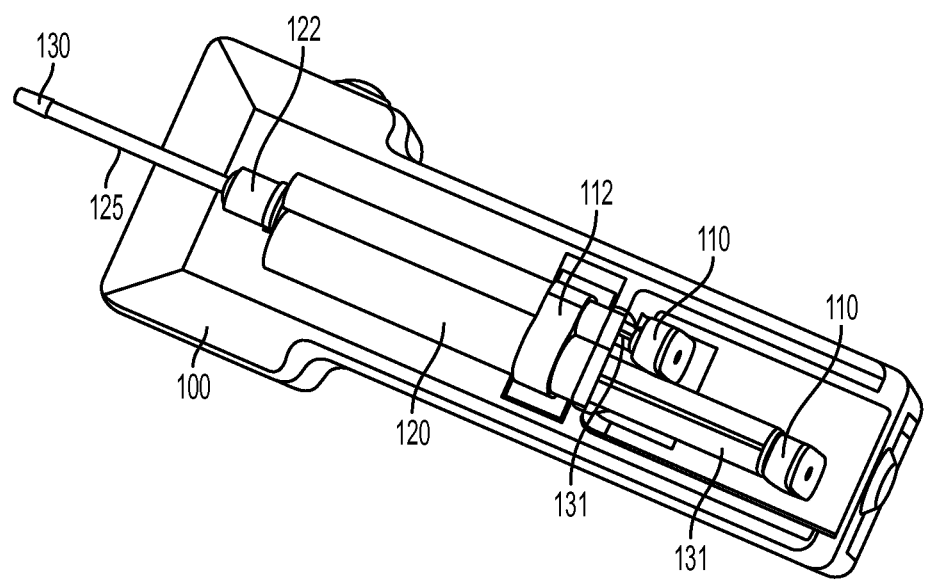
FIG. 2-4 are diagrams of exemplary epoxy dispensing systems with cartridges coupled thereto.

Referring now to FIG. 2, a diagram of a cartridge loaded onto an epoxy dispensing system 100 is shown and described. A latch 112 may secure the cartridge on the epoxy dispensing system 100. For example, the latch 112 may extend over a portion of the cartridge. The latch 112 may connect to a clasp and lock the cartridge into a position. The cartridge may include dual barrels 120 containing materials to be mixed into an epoxy. In some implementations, the barrels 120 may have the same size, e.g., equal internal diameters and/or equal lengths. In some implementations, one barrel 120 may have a larger internal diameter than the other barrel 120 of the cartridge. In some implementations, when one barrel 120 has a larger internal diameter than the other barrel 120, the cartridge may be loaded onto the epoxy dispensing system 100 according to a sole configuration. Exemplary ratios between the cross-sectional areas of the barrels 120 may include 1:1, 1:2, 1:4, and/or 1:10, although other ratios of cross-sectional areas may be used.

The cartridge may include a cap receiver 122. The cap receiver 122 may receive a cap (not shown, but described in more detail below) to seal the cartridge. In some implementations, when the cap and cap receiver 122 form a seal for the cartridge, the cap may block exposure to air for the materials in the cartridge's barrels. The cap may be removed from the cap receiver 122 before the cartridge is loaded onto the epoxy dispensing system 100 for use. After a user finishes using the cartridge, the user may replace the cap on the cap receiver 122 to preserve the materials in the barrels for future use.

The cartridge may include a mixing tip 125 removably coupled to the cap receiver 122. The mixing tip 125 may include a flow pattern (e.g., a convoluted flow pattern) that mixes materials as the materials flow through the tip 125. In some implementations, the materials are sufficiently mixed to form the epoxy after the materials have flowed through a predetermined length of the flow pattern. In some implementations, the length of the mixing tip 125 may be between about 1.50 inches and about 3.0 inches, although other lengths may be used. In some implementations, the diameter of the mixing tip 125 may be between about $\frac{1}{8}^{th}$ and about $\frac{1}{4}^{th}$ of an inch, although other diameters may be used.

Figure 4:
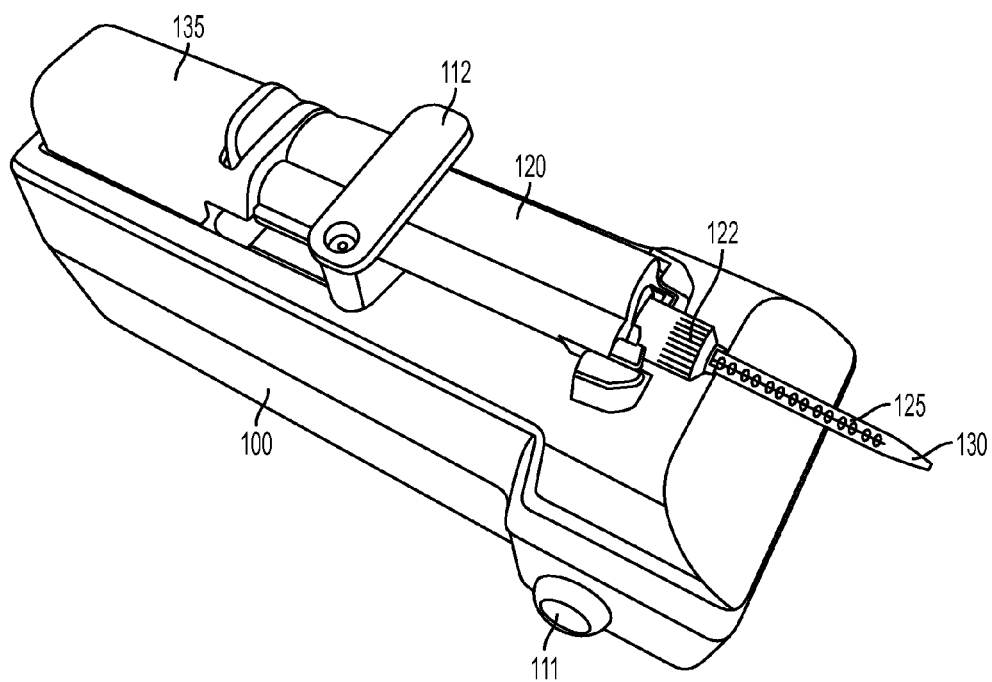

In some implementations, the mixing tip 125 may include at least one helical mixing element (shown, for example, as mixer 127 in FIG. 4). In some implementations, the mixing tip 125 may include between about 12 and about 24 helical mixing elements to achieve adequate mixing of the materials. In some implementations, after the materials have flowed through the mixing tip 125 for the predetermined length, the materials have been mixed to achieve at least 90% homogeneity. In some implementations, after a user of the epoxy dispensing system 100 has finished dispensing epoxy into a terminus, the user may remove the mixing tip 125 from the cap receiver 122 and/or discard the mixing tip 125.

The cartridge may include a dispensing tip 130 removably coupled to the mixing tip 125. In some implementations, the dispensing tip 125 may be shaped to match an end of a terminus. The dispensing tip 125 may be shaped for insertion into the end of a terminus. After a user has used the epoxy dispensing system 100 to flow epoxy through the dispensing tip 130 into the terminus, the user may remove the dispensing tip 130 from the cartridge and/or mixing tip 125 and discard the dispensing tip 130.

The cartridge may include plungers 131, each plunger coupled to a barrel 120 of the cartridge. When the cartridge is loaded onto the epoxy dispensing system 100, each plunger pusher 110 may be coupled to a plunger 131 of the cartridge. The plunger pushers 110 may advance the plungers 115 of the cartridge to dispense materials contained in the cartridge's barrels to form the epoxy, as described in more detail below.

Figure 3:
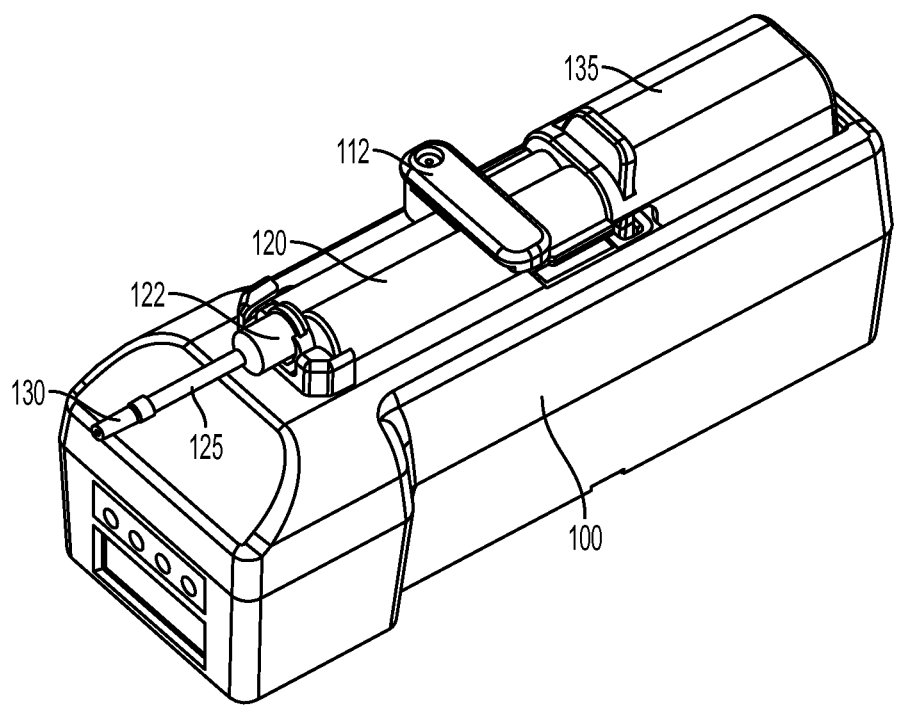

Referring now to FIG. 3-4, diagrams of cartridges loaded onto exemplary epoxy dispensing systems 100 are shown and described. The epoxy dispensing system 100 may include a cover 135 disposed over the plunger pushers 110 and/or the plungers 131 of the cartridge. The epoxy dispensing system 100 may include a dispense button 111 for operating the system 100. When a user activates the dispense button 111, the system 100 may advance the plunger pushers 110 against the cartridge's plungers 131 to dispense material in the barrels of the cartridge.

Figure 5A:
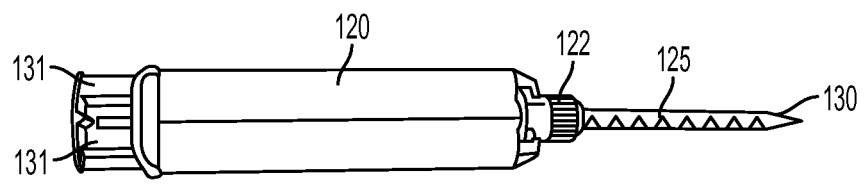
FIG. 5A is a diagram of an exemplary resealable cartridge and a mixing tip coupled to the cartridge.

FIG. 5A is a diagram of an exemplary resealable cartridge and a mixing tip coupled to the cartridge. The cartridge includes plungers 131, dual barrels 120 containing materials to be mixed for the epoxy, a cap receiver 122, and a mixing tip 125. In some implementations, the dual barrels 120 containing the materials may be de-gassed.

Figure 5B:
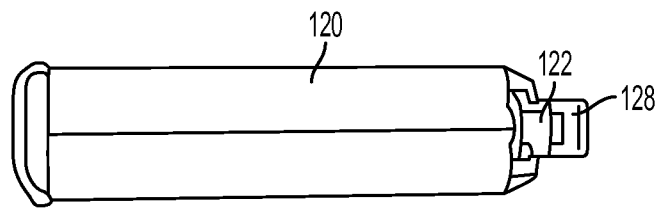
FIG. 5B is a diagram of an exemplary resealable cartridge with a cap.

FIG. 5B is a diagram of an exemplary resealable cartridge with a cap. In some implementations, the cartridge may include a cap 128 that may be removably coupled to the cap receiver 122. When the cap 128 is coupled to the cap receiver 122 (e.g., screwed onto the receiver 122), the cap 128 may prevent the materials in the barrels 120 from exposure to air. Thus, the cap 128 may preserve the shelf-life of the materials. After a user has completed using the epoxy for terminations, the user may replace the cap 128 on the cap receiver 122 and store the cartridge for future uses.

Figure 6:
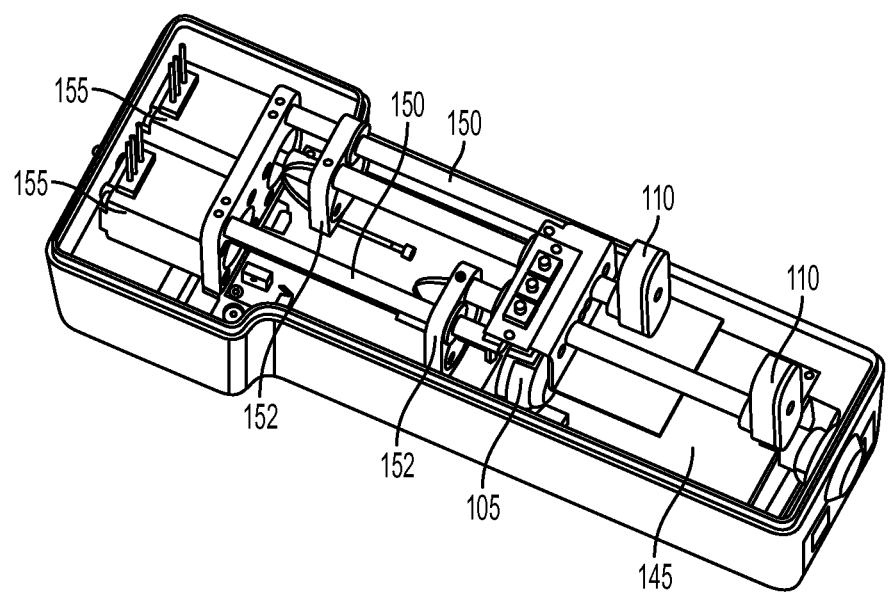
FIG. 6-8 are diagrams of exemplary epoxy dispensing systems adapted to advance plunger pushers against barrels of a cartridge at different rates to dispense the materials in the barrels in proportions appropriate for the epoxy.
Figure 7:
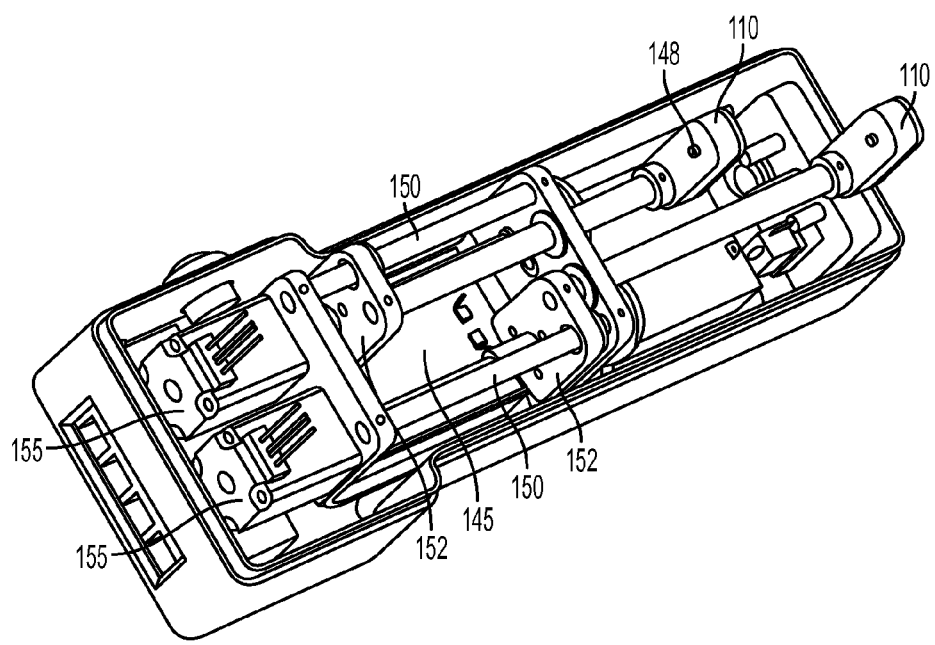
Figure 8:
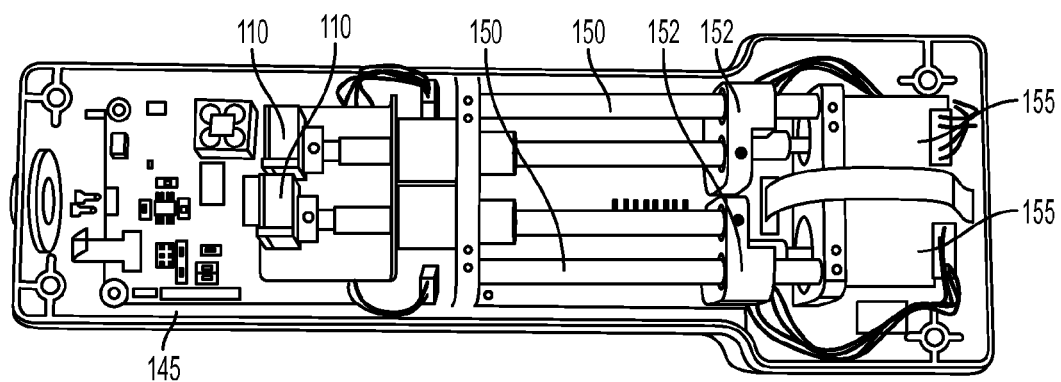

FIG. 6-8 are diagrams of exemplary epoxy dispensing systems adapted to advance plunger pushers against barrels of a cartridge at different rates to dispense the materials in the barrels in proportions appropriate for the epoxy. The epoxy dispensing system 100 may include a processor board 145 that controls the operations of the epoxy dispensing system 100. In some implementations, the processor board 145 may include a microprocessor. In some implementations, the processor board 145 may include a printed circuit board (PCB). In some implementations, the processor board 145 may be an application specific integrated circuit (ASIC). In some implementations, the processor board 145 may include programmable instructions in a memory. A processor and/or microprocessor may retrieve instructions from the memory for execution.

In some implementations, when a cartridge is loaded onto the epoxy dispensing system 100, contact between the latch 112 and a clasp (not shown) may send a signal to the processor board 145 indicating that a cartridge has been loaded. In some implementations, in response to the contact, the processor board 145 may instruct the motors 155 to advance the plunger arms 110 until contact sensors 148 disposed on the plunger arms 110 make contact with the plungers 131 of the cartridge. In some implementations, the processor board 145 may instruct the motors 155 to advance the plunger arms until the contact sensors 148 make contact with the plungers 131 when the processor board 145 receives a signal from the dispense button 111 indicating that a user is operating the epoxy dispensing system 100.

In some implementations, the processor board 145 may instruct motors 155 to operate the lead screws 150 and lead screw stages 152 to advance the plunger pushers 110. In some implementations, the contact sensors 148 may be pressure sensors. The contact sensors 148 may transmit signals to the processor board 145 indicating the amount of pressure being applied to the contact sensors 148. In some implementations, the contact sensors 148 may transmit such signals on a continuous basis. The processor board 145 may monitor the signals from the contact sensors 148.

When the contact sensors 148 make contact with the plungers 131, the pressure applied to the contact sensor 148 may increase due to the resistance of the material in the barrels against the plunger pushers 110. The contact sensors 148 may transmit signals to the processor board 145 indicating the amount of pressure applied by the presence of the material. In some implementations, the processor board 145 may compare the signal from a contact sensor 148 to a threshold. If the amount of pressure applied to a contact sensor 148 equals or exceeds a predetermined threshold, the processor board 145 may determine the plunger pusher 110 has contacted the plunger 131 of a barrel. In some implementations, the processor board 145 may determine the plunger pusher 110 has advanced the plunger 131 of a barrel until further advancement would dispense material contained in the barrel into the mixing tip 125. In some implementations, the processor board 145 may instruct the motor 155 corresponding to the barrel to halt advancement of the plunger pusher 110.

In some implementations, the processor board 145 may determine a rate at which to advance one of the plunger pushers 110 against one of the plungers 131 coupled to one of the barrels of the cartridge. The processor board 145 may determine a rate at which to advance the other plunger pusher 110 against the other plunger 131 coupled to the other barrels of the cartridge. Although the implementations depicted herein include two plunger pushers 110, two plungers 131, and two barrels, implementations with any number of the components may also be used.

In some implementations, the processor board 145 may determine the rates for advancing the plunger pushers 110 based at least in part on the code on the cartridge. The code may be associated with the type of epoxy to be formed from the materials in the cartridge, the materials in the cartridge, the cross-sectional volume of the barrels of the cartridge, the proportion of materials to be dispensed and/or mixed to form the epoxy, and/or any combination thereof.

In some implementations, the processor board 145 accesses a look-up table to determine the rates for advancing the plunger pushers 110. The processor board 145 may use the code from the cartridge as an index into the entries in the look-up table. Using the code, the processor board 145 may retrieve the rates for advancing the plunger pushers 110. In some examples, if the code is "001", the processor board 145 may access the first entry in a look-up table. The entry may indicate that for the type of epoxy to be mixed from a cartridge with the "001" code, the plunger pushers 110 should be advanced at the same rate. In some implementations, the motors 155 may advance each plunger pusher 110 at rates between about 0.1 mm/s and about 2.0 mm/s, although other rates may be used.

In some examples, if the code is "001" (e.g., a physical component of the cartridge triggers a sole sensor located at a particular end of the code detector 105, the cartridge includes a label with the alphanumeric code "001"), the processor board 145 may access the second entry in a look-up table. The entry may indicate that for the type of epoxy to be mixed from a cartridge with the "001" code, one of the plunger pushers 110 should be advanced at the rate that is 50% faster than the rate for advancing the other plunger pusher 110. For example, a motor 155 may advance the first plunger pusher 110 by 1.0 mm/s while the other motor 155 may advance the second plunger pusher 110 by 1.5 mm/s.

In some examples, if the code is "010" (e.g., a physical component of the cartridge triggers a central sensor of the code detector 105, the cartridge includes a label with the alphanumeric code "010"), the processor board 145 may access the third entry in a look-up table. The entry may indicate that for the type of epoxy to be mixed from a cartridge with the "010" code, one of the plunger pushers 110 should be advanced at the rate that is 100% faster than the rate for advancing the other plunger pusher 110. For example, a motor 155 may advance the first plunger pusher 110 by 1.0 mm/s while the other motor 155 may advance the second plunger pusher 110 by 2.0 mm/s.

In some implementations, if the code is "000" (e.g., sensors of the code detector 105 are not being triggered), the processor board 145 may determine that a cartridge is not present. In some implementations, if the code is "000" the processor board 145 may determine that a cartridge has been improperly loaded into the epoxy dispensing system 100. In some implementations, the epoxy dispensing system 100 may power an error indicator (not shown). When the error indicator has been lit, the user of the epoxy dispensing system 100 may determine that the epoxy dispensing system 100 has not detected a code for a cartridge, In some implementations, the processor board 145 may continually monitor a signal from the dispense button 111. The processor board 145 may compare the signal with a threshold associated with operating the epoxy dispensing system 100. When the signal from the dispense button 111 falls below the threshold (e.g., indicating that the user is no longer operating the epoxy dispensing system 100), the processor board 145 may instruct the motors 155 to halt advancement of the plunger pushers 110.

Figure 9:
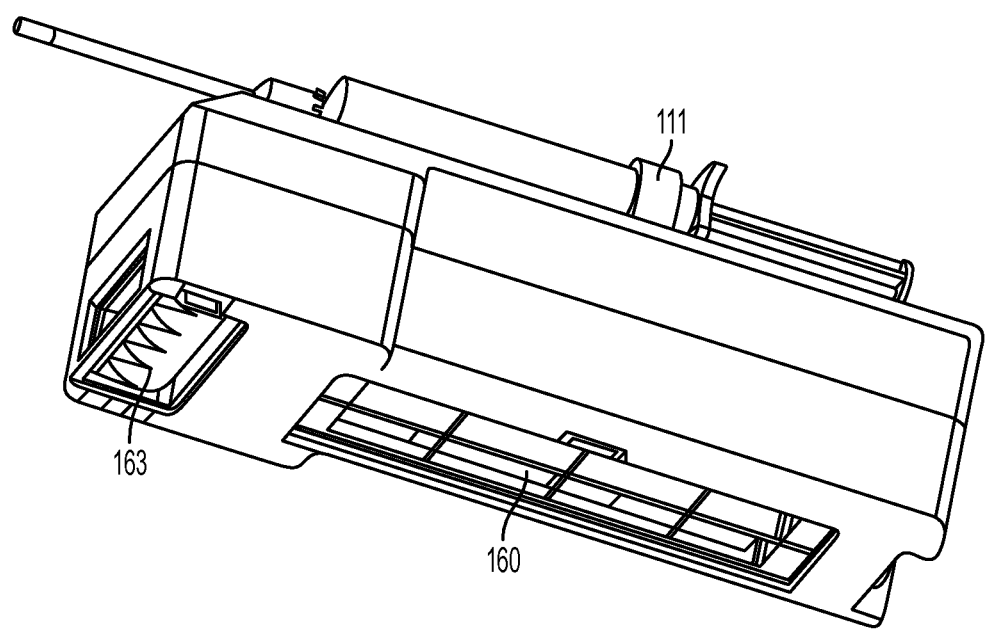
FIG. 9 is a diagram of an exemplary epoxy dispensing system with battery and wipe media compartments.

Referring now to FIG. 9, a diagram of an exemplary epoxy dispensing system with battery and wipe media compartments is shown and described. The housing 101 of the system 100 may include a compartment 160 that receives a battery. When the battery is inserted into the compartment 160, power from the battery may flow into the epoxy dispensing system 100 to supply power to, among other components, the processor board 145, the motors 155, and the code detector 105. In some implementations, the battery may be removed from the compartment 160, recharged, and reinserted into the compartment 160.

In some implementations, the epoxy dispensing system 100 may include a wipe media compartment 163 for storing a media used to wipe a surface of a terminus of excess epoxy. In some implementations, the media may be an absorbent cellulose material. In some implementations, the media may be a cellulose and/or polymer fiber blend, although other materials may be used. In some implementations, the wipe media compartment 163 may be refillable.

Figure 10:
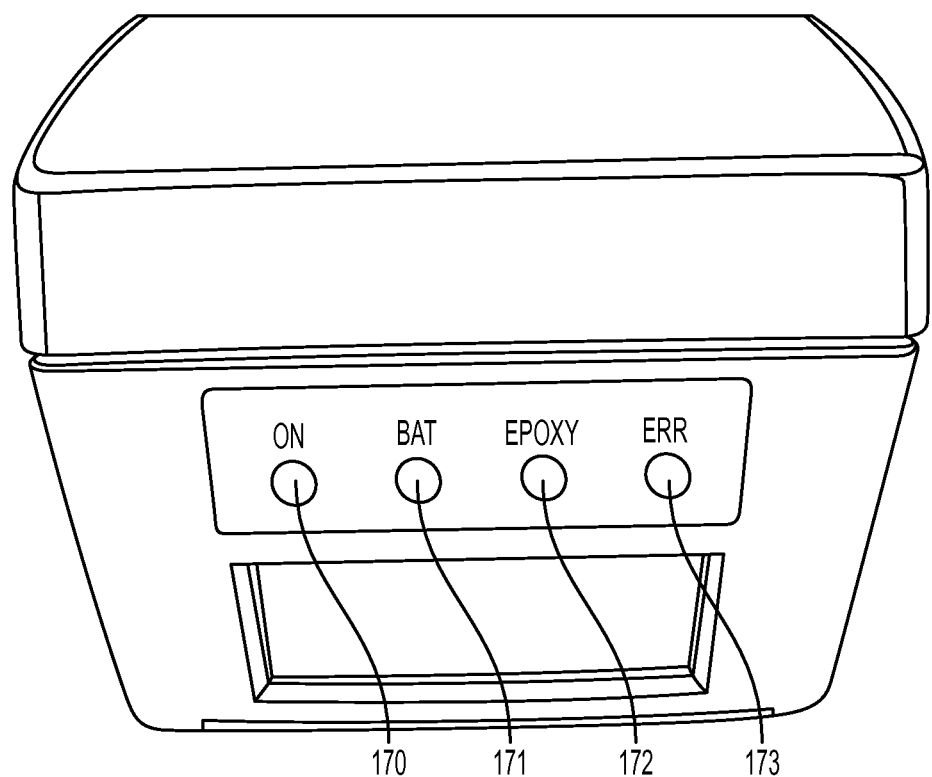
FIG. 10 is an exemplary interface with indicators regarding the operation of an epoxy dispensing system.

Referring now to FIG. 10, an exemplary interface on an end of the epoxy dispensing system 100 with indicators regarding the operation of the system is shown and described. In some implementations, the interface may include a power indicator 170. The processor board 145 may transmit a signal to light the power indicator 170 when the epoxy dispensing system 100 is powered on. For example, the processor board 145 may transmit the signal when a battery in the battery compartment 160 has sufficient power to power the system 100. In some examples, the processor board 145 may transmit the signal when the processor board 145 detects that the epoxy dispensing system 100 has been connected to a power source (e.g., an alternative current power jack of the system 100 has been connected to an electricity socket).

The interface may include a battery indicator 171. In some implementations, the processor board 145 may direct power from a battery to light the battery indicator 171 when the epoxy dispensing system 100 is drawing power from the battery. In some implementations, the processor board 145 may monitor a level of voltage and/or power being provided by the battery. The processor board 145 may compare the level of voltage and/or power with one or more thresholds to determine whether the battery has a low level of voltage and/or power. In some implementations, when the processor board 145 determines the battery has a low level of voltage and/or power, the processor board 145 may operate the battery indicator 171 to pulse off and on, thereby indicating to a user that the battery needs to be replaced and/or recharged.

The interface may include an epoxy dispensing indicator 172. In some implementations, when a user operates the dispensing button 111, the epoxy dispensing indicator 172 may light up to indicate the epoxy dispensing system 100 is operating. In some implementations, the processor board 145 may receive a signal from the dispensing button 111. The processor board 145 may compare the signal to a threshold. If the signal equals or exceeds the threshold, the processor board 145 may transmit a signal to power the epoxy dispensing indicator 172. In some implementations, the epoxy dispensing indicator 172 may be connected to a switch and a voltage source (not shown). In some implementations, when the user operates the dispensing button 111, the dispensing button 111 sends a signal that turns on the switch. When the switch is on, voltage may flow from the voltage source through the epoxy dispensing indictor 172 to light the indicator 172.

The interface may include an error indicator 173. In some implementations, the processing board 145 may send a signal to light the error indicator 173 whenever an error has occurred. For example, in some implementations, the processing board 145 may not recognize a code on a cartridge. As the processing board 145 may not determine the rates at which the plunger pushers 110 should be advanced, the epoxy dispensing system 100 may not operate. The processing board 145 may light the error indicator 173 to alert the user that a problem with the system 100 has occurred.

Figure 11:
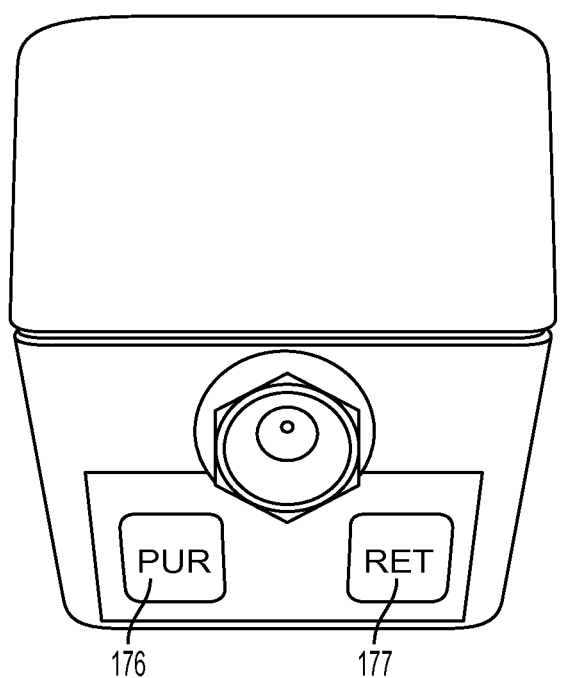
FIG. 11 is an exemplary interface on an end of the epoxy dispensing system with controls for the operation of the system.

Referring now to FIG. 11, an exemplary interface on an end of the epoxy dispensing system 100 with controls for the operation of the system 100 is shown and described. In some implementations, the interface may include a power jack. The power jack may receive a connector that may be connected to a power source, such as an alternative current (AC) power source. In some implementations, the power jack may enable the epoxy dispensing system 100 to be connected to an external power source, such as electricity provided through wall sockets in a building.

The interface may include a control 176 for priming a mixing tip 125 and/or dispensing tip 130. In some implementations, when a user operates the priming control 176, the processor board 145 may operate the motors 155 to advance the plunger arms 110 to dispense a total volume of material equal to at least the volume of the mixing tip 125. In some implementations, the plunger arms 110 may operate to displace the air in the mixing tip 125 with materials for the epoxy. In some implementations, the plunger arms 110 may dispense a total volume of material from the barrels 120 greater than the volume of the mixing tip 125. In some implementations, the plunger arms 110 dispense a total volume of material to ensure that epoxy at the end of the tip 125 is adequately mixed and thus, ready to be dispensed into the interior of a terminus.

The interface may include a control 177 for retracting the plunger pushers 110 to a fully extended position (e.g., the plunger pushers 110 may be retracted as far as possible). In some implementations, the user may operate the retracting control 177 to retract the plunger pushers 110. The processor board 145 may receive a signal from the retracting control 177. In response, the processor board 145 may operate the motors 177 to drive the plunger pushers 110 to the fully extended position. The user may operate the retracting control 177 when the user wishes to load a new, different, and/or full cartridge onto the epoxy dispensing system 100. In some implementations, the user may operate the retracting control 177 when the user has finished dispensing epoxy from a cartridge loaded onto the system 100 and the user wishes to unload the cartridge.

The systems, software, and methods described herein may be implemented advantageously in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object oriented programming language, or in assembly or machine language if desired. In any case, the language may be a compiled or interpreted language. Suitable processors include, by way of example, both general and special purpose microprocessors. Generally, a processor (e.g., one or more processors) will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing may be supplemented by, or incorporated in, ASICs (application-specific integrated circuits).

Figure 12:
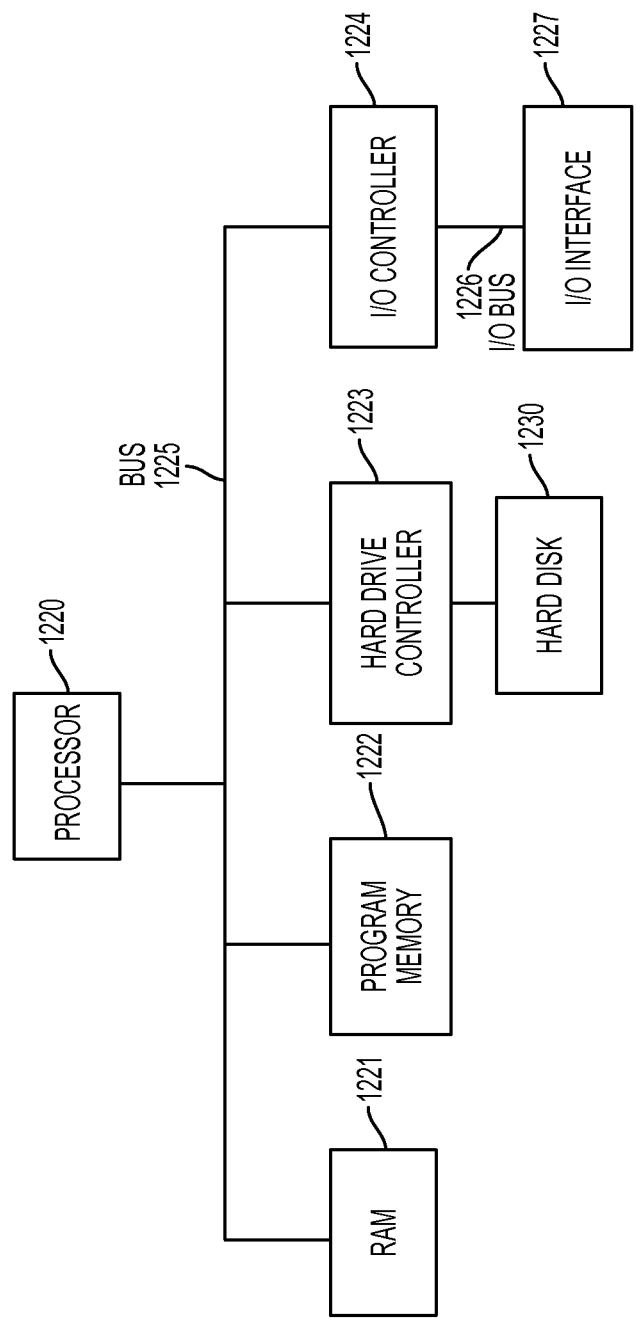
FIG. 12 is a block diagram of an exemplary computing device usable in and/or with the epoxy dispensing system.

An example of one such type of computer is shown in FIG. 12, which shows a block diagram of a programmable processing system (system) 1200 suitable for implementing or performing the apparatus or methods described herein. The system 1211 includes a processor 1220, a random access memory (RAM) 1221, a program memory 1222 (for example, a writeable read-only memory (ROM) such as a flash ROM), a hard drive controller 1223, and an input/output (I/O) controller 1224 coupled by a processor (CPU) bus 1225. The system 1211 may be preprogrammed, in ROM, for example, or it can be programmed (and reprogrammed) by loading a program from another source (for example, from a floppy disk, a CD-ROM, external disk drive, USB key, or another computer).

The hard drive controller 1223 may be coupled to a hard disk 1230 suitable for storing executable computer programs, including programs embodying the present methods, and data including storage. The I/O controller 1224 may be coupled by an I/O bus 1226 to an I/O interface 1227. The I/O interface 1227 may receive and transmit data in analog or digital form over communication links such as a serial link, local area network, wireless link, and parallel link.

An exemplary method for operating an epoxy dispensing system is shown and described. The method may include detecting a code on a dual-barrel cartridge, the code corresponding to a type of epoxy to be mixed from a first material in a first barrel of the dual-barrel cartridge and a second material in a second barrel of the dual-barrel cartridge. The method may include determining a first rate at which to advance a first plunger against the first barrel based at least in part on the code. The method may include determining a second rate at which to advance a second plunger against the second barrel based at least in part on the code.

In further detail, the method may include detecting a code on a dual-barrel cartridge, the code corresponding to a type of epoxy to be mixed from a first material in a first barrel of the dual-barrel cartridge and a second material in a second barrel of the dual-barrel cartridge. A code detector may determine whether at least one touch sensor has been triggered. The code detector may determine whether at least one light detector has been blocked from receiving light from a light emitter. The code detector may detect at least one position of at least one mechanical switch. The code detector may detect at least one bar code. The code detector may detect at least one alphanumeric code. A processor may receive signals from the code detector to determine a code. The code may be detected according to any of the methods described herein.

The method may include determining a first rate at which to advance a first plunger against the first barrel based at least in part on the code. In some implementations, a processor may access an entry in a look-up table associated with the code, the entry including the first rate. In some implementations, the processor may retrieve an entry in a look-up table indexed according to the code, the entry including the first rate. The processor may determine the first rate according to any of the methods described herein.

The method may include determining a second rate at which to advance a second plunger against the second barrel based at least in part on the code. In some implementations, a processor may access an entry in a look-up table associated with the code, the entry including the second rate. In some implementations, the processor may retrieve an entry in a look-up table indexed according to the code, the entry including the second rate. The processor may determine the second rate according to any of the methods described herein.

Figure 13:
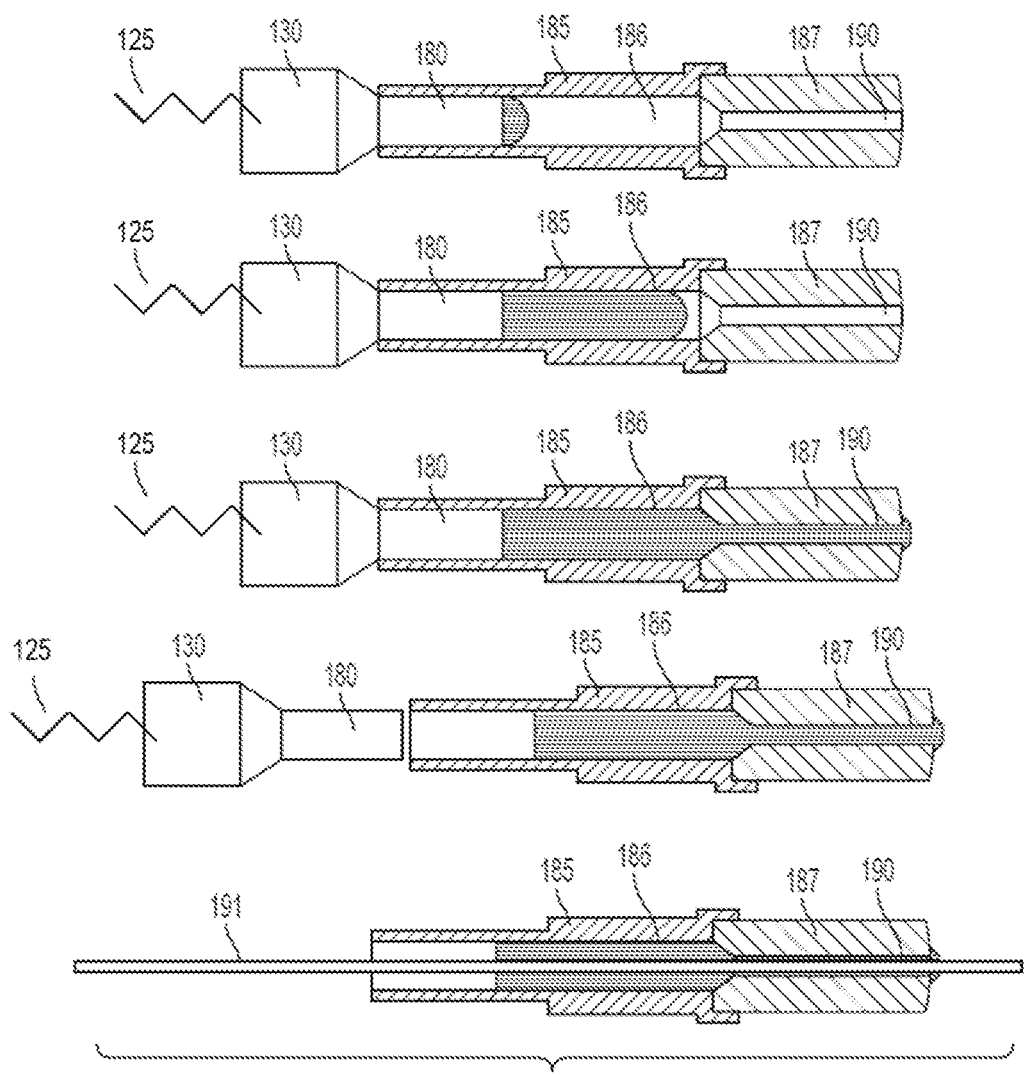
FIG. 13 is a depiction of an epoxy dispensing tip as the epoxy dispensing tip is used to fill an interior of a terminus with epoxy.
Figure 14A:
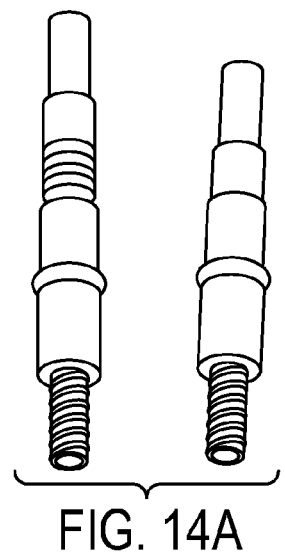
FIG. 14A-14C show various fiber cable termini.
Figure 14B:
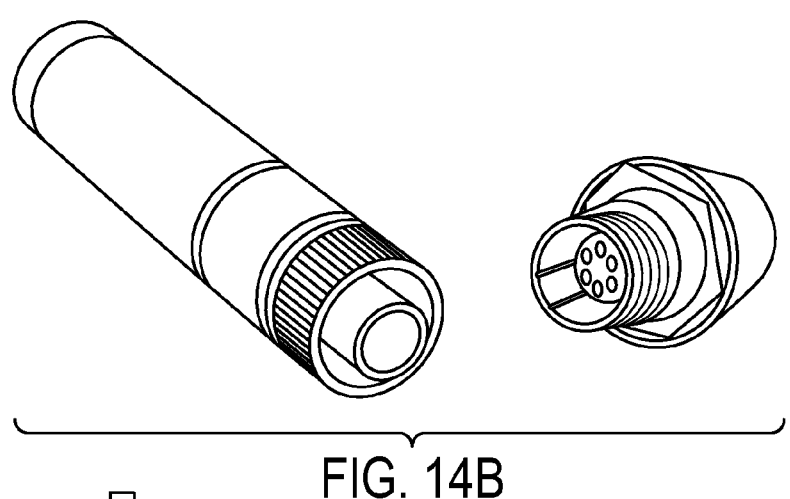
Figure 14C:
Figure 15:
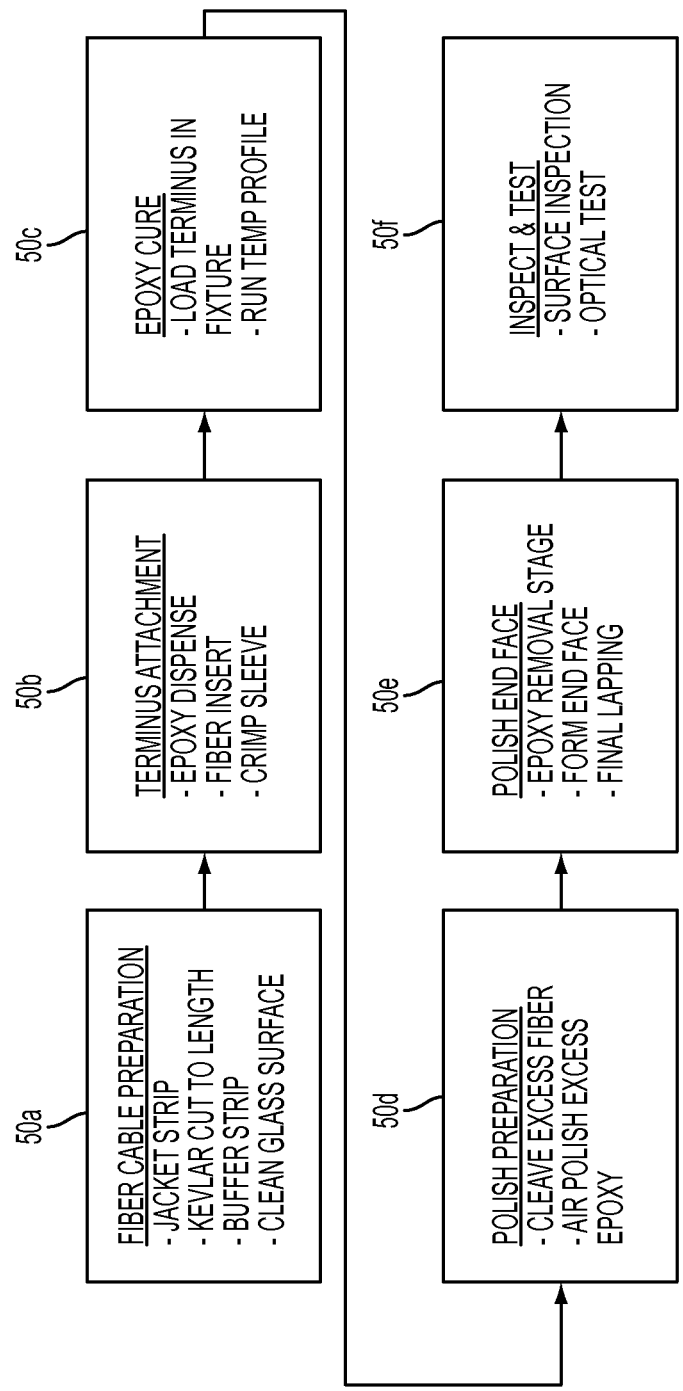
FIG. 15 is a flow chart of a method for terminating an optical cable.

Referring now to FIG. 13, diagrams depicting a dispensing tip as the dispensing tip may be used to fill an interior of a terminus with epoxy are shown and described. A dispensing tip may have a first portion 130 and may have a distal end or second portion 180. The distal end 180 may be adapted to be inserted into an end of a terminus 185. In some implementations, the distal end 180 may be inserted into a portion of a chamber 186 within the terminus 185. In some implementations, the distal end 180 may be adapted to extend a predetermined distance into the chamber 186. For example, the distal end 180 may be adapted to extend into the chamber 186 a distance between about 0.12 and about 0.5 inches, although other distances may be used. In some implementations, the dispensing tip 130 may have a shape that enables solely the distal end 180 to be inserted into the end of the terminus.

In some implementations, the distal end 180 may be adapted to substantially form a seal with the terminus when the distal end 180 is inserted into the end of the terminus. Dimensions of the distal end 180 may be matched to dimensions of the terminus. In some implementations, the outer diameter of the distal end 180 may match the inner diameter of the chamber 186 in the terminus 185. In some implementations, a shape of the distal end 180 may match a shape of the chamber 186. In some implementations, a cross-sectional area of the distal end 180 may match a cross-section area of the chamber 186 of the terminus 185.

The dispensing tip 130 may be coupled to a mixing tip 125, which may in turn be coupled to a cartridge loaded onto an epoxy dispensing system 100. As a user operates the dispensing system 100, epoxy may flow through the dispensing tip 130 into the terminus 185. In some implementations, as the epoxy flows through the chamber 186 in the terminus 185 and a chamber 190 in a ferrule 187 coupled to the terminus 185, the epoxy expels air to completely fill the chambers 186, 190. In some implementations, the epoxy may fill the chambers 186, 190 until the epoxy begins to flow out of the chamber 190 in the ferrule. A user may determine the chambers 186, 190 have been filled with epoxy when epoxy begins to flow from the chamber 190 in the ferrule 187.

In operations, the technician docks and holds a terminus/connector to the dispense tip. The epoxy is dispensed into the rear of the terminus. A small amount of pressure is required to be applied to the tip so that a seal is made between the terminus and the tip. Dispensing is performed by depressing a switch on the unit. When epoxy is visible on the end face of the terminus, the switch can be released and dispensing is complete. The last step in the process is to remove any excess epoxy from the surface of the terminus ferrule. A supply of cleaning media is incorporated on the unit that presents a clean area to the operator for wiping the terminus ferrule for convenience.

In some implementations, the dispensing tip 130 may be withdrawn from the end of the terminus 185. In some implementations, because of the seal formed between the distal end 180 of the dispensing tip 130 and the chamber 186 of the terminus 185, the distal end 180 may not withdraw epoxy through the chamber 186 as the distal end 180 is withdrawn from the terminus 185.

A user may insert an optical fiber 191 through the chambers 186, 190 of the terminus 185 and the ferrule 187. In some implementations, the user may insert the optical fiber until an end of the optical fiber may be visible beyond the end of the ferrule 187. As the optical fiber is inserted into the chambers 186, 190, the optical fiber may displace epoxy. In some implementations, the epoxy may flow into the portion of the chamber 186 previously occupied by the distal end 180 of the dispensing tip 130. In some implementations, the optical fiber may displace the amount of epoxy sufficient to fill the portion of the chamber 186 previously occupied by the distal end 180. Thus, the volume of the distal end 180 inserted into the chamber 186 may be selected to match the epoxy to be displaced by the optical fiber. In some implementations, the length and/or cross-sectional area of the distal end 180 may be selected to attain a predetermined volume into which epoxy displaced by the optical fiber may flow.

While various implementations of the methods and systems have been described, these implementations are exemplary and in no way limit the scope of the described methods or systems. Those having skill in the relevant art may effect changes to form and details of the described methods and systems without departing from the broadest scope of the described methods and systems. Thus, the scope of the methods and systems described herein should not be limited by any of the exemplary implementations and should be defined in accordance with the accompanying claims and their equivalents.

What is claimed is:

1. A method for attaching a fiber optic terminus of a fiber optic connector to a fiber optic cable, the method comprising:
   inserting a dispensing tip of an automated epoxy dispenser into the fiber optic terminus of the fiber optic connector, wherein the dispensing tip is shaped to engage with an interior surface of the fiber optic terminus and an outer surface of the dispensing tip is adapted to conform to the interior surface of the fiber optic terminus to maintain sealable engagement with the interior surface of the fiber optic terminus during insertion,
   wherein the automated epoxy dispenser comprises a cartridge having (i) a first barrel containing a first material for forming an epoxy and (ii) a second barrel containing a second material for forming the epoxy, the first barrel and the second barrel being coupled to a mixing chamber of the automated epoxy dispenser for combining and mixing a portion of the first material and a portion of the second material to form the epoxy as the first material and the second material traverse therethrough, the mixing chamber being coupled to the dispensing tip for dispensing the epoxy into the fiber optic terminus, wherein the dispensing tip comprises a mixer, the dispensing tip having a first portion having an internal diameter dimensioned to allow the first material and second material to mix-ably flow therethrough, the mixer having a plurality of mixing elements that extend through a portion of the length of the first portion and wherein the dispensing tip comprises a second portion having an outer surface dimensioned to conform to the interior surface of the fiber optic terminus;

determining, by a processor of a computing device, a first rate and a second rate for advancing a first motorized plunger and a second motorized plunger element of the epoxy dispenser against the first barrel and the second barrel, respectively, according to an epoxy formulation to be formed from the first material and the second material;

injecting the epoxy into the fiber optic terminus to, at least, fill a volume in the fiber optic terminus by advancing the first motorized plunger and the second motorized plunger element against the first barrel and the second barrel, respectively, and at the first rate and the second rate, respectively, wherein the volume is defined by the interior surface of the fiber optic terminus and the dispensing tip, and wherein the dispensing tip remains engaged with the interior surface of the fiber optic terminus during the advancement of the first motorized plunger and the second motorized plunger; and attaching the fiber optic cable to the dispensed epoxy within the filled volume of the fiber optic terminus.

2. The method of claim 1, comprising:
detecting a setting on a control of the epoxy dispenser, the epoxy formulation or the epoxy to be formed.

3. The method of claim 1, comprising:
detecting a code on the cartridge, the code corresponding to the epoxy formulation or the epoxy to be formed.

4. The method of claim 3, wherein detecting the code on the cartridge comprises:
determining, by the computing device, whether at least one touch sensor of the automated epoxy dispenser has been triggered.

5. The method of claim 3, wherein detecting the code on the cartridge comprises:
determining, by the computing device, whether at least one light detector of the automated epoxy dispenser has been blocked from receiving light from a light emitter of the automated epoxy dispenser.

6. The method of claim 3, wherein detecting the code on the cartridge comprises:
detecting, by the computing device, at least one position of at least one mechanical switch of the automated epoxy dispenser.

7. The method of claim 3, wherein detecting the code on the cartridge comprises:
detecting, by the computing device, at least one bar code disposed on the cartridge.

8. The method of claim 3, wherein detecting the code on the cartridge comprises:
detecting, by the computing device, at least one alphanumeric code disposed on the cartridge.

9. The method of claim 1, wherein the first rate is retrieved, by the processor, from an entry in a look-up table associated with the epoxy to be mixed.

10. The method of claim 1, wherein the second motorized plunger is advancable independently of the first motorized plunger such that a proportion between the second rate and the first rate is variable depending on the epoxy formulation, and wherein the epoxy formulation comprises a proportion between an amount of the first material and an amount of the second material to be dispensed for forming the epoxy.

11. The method of claim 1, wherein the insertion extends a pre-defined length of the dispensing tip into the fiber optic terminus to define the volume to be filled with the epoxy in the fiber optic terminus, the volume defining an epoxy-dispensed portion of the fiber optic terminus to receive the fiber optic cable.

12. The method of claim 1, wherein the volume comprises (i) a chamber defined by the dispensing tip and the interior surface of the fiber optic terminus and (ii) a spacing through a ferrule engaged with the terminus, the chamber and spacing being adapted to receive the fiber optic cable.

13. The method of claim 1, wherein the first barrel is pre-filled with the first material and second barrel has been pre-filled with the second material, wherein the first material and the second material is degassed prior to the first barrel and the second barrel being installed into the epoxy dispenser.

14. The method of claim 1, wherein the epoxy dispenser comprises the processor.

15. An epoxy dispensing apparatus comprising:
a cartridge receptacle adapted to receive a cartridge having (i) a first barrel containing a first material for forming an epoxy and (ii) a second barrel containing a second material for forming the epoxy, the first barrel and the second barrel being coupled to a mixing chamber of the epoxy dispenser apparatus for combining and mixing the first material and the second material to form the epoxy when traverse there through; and a dispensing tip coupled to the mixing chamber to receive the epoxy formed in the mixing chamber, the dispensing tip comprising an end for dispensing the received epoxy, said end being adapted to be inserted into a fiber optic terminus of a fiber optic connector and to engage an interior surface of the fiber optic terminus such that (i) the insertion forms a seal with the interior surface of the fiber optic terminus and an outer surface of the dispensing tip, wherein the outer surface is adapted to conform to the interior surface of the fiber optic terminus, (ii) the engagement maintains the dispensing tip with respect to the interior surface during the insertion, and (iii) the insertion extends a pre-defined length of the dispensing tip into the fiber optic terminus to define a chamber to be filled with the epoxy, the chamber defining an epoxy dispensed portion of the fiber optic terminus to receive a fiber optic cable, wherein the dispensing tip comprises a mixer, the dispensing tip having a first portion having an internal diameter dimensioned to allow the first material and the second material to mix-ably flow therethrough, the mixer having a plurality of mixing elements that extend through a portion of the length of the first portion and wherein the dispensing tip comprises a second portion having an outer surface dimensioned to conform to the interior surface of the fiber optic terminus.

16. The apparatus of claim 15, further comprising:
a code detector adapted to receive a code on the cartridge loaded onto the apparatus, the code corresponding to the epoxy to be mixed.

17. The apparatus of claim 15, comprising:
determining, by a processor of the apparatus, a first rate at which to advance a first motorized plunger element against the first barrel based at least in part on the determined epoxy formulation, and
determining, by the processor of the apparatus, a second rate at which to advance a second motorized plunger element against the second barrel based at least in part on the determined epoxy formulation, wherein the second motorized plunger is advancable independently of the first motorized plunger such that a difference between the second rate and the first rate is variable depending on the determined epoxy formulation.

18. The apparatus of claim 15, wherein the length of the mixer is between 1.5 and 3 inches and the first diameter is between ⅛ and ¼ of an inch.

19. The method of claim 15, wherein the mixer comprises between 12 and 24 helical mixing elements.

* * * * *